March 10, 1964 W. H. BRACKBILL ETAL 3,123,966
ADJUSTABLE DRIVE MECHANISM FOR SIDE DELIVERY RAKE
Filed March 8, 1962 2 Sheets-Sheet 2

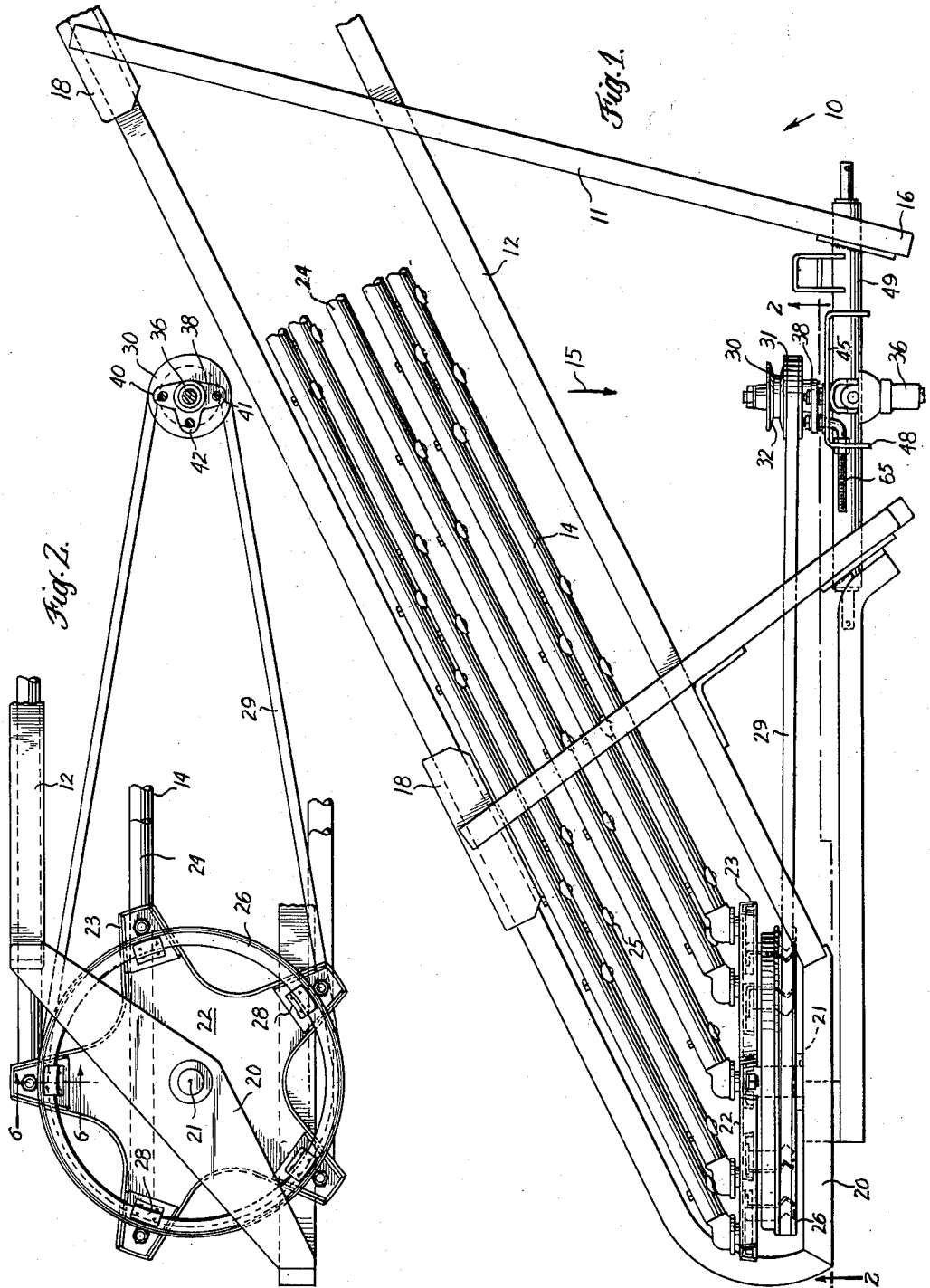

INVENTORS
WARREN H. BRACKBILL &
EMMETT F. GLASS
BY
Joseph A. Brown
ATTORNEY

United States Patent Office 3,123,966
Patented Mar. 10, 1964

3,123,966
ADJUSTABLE DRIVE MECHANISM FOR SIDE DELIVERY RAKE
Warren H. Brackbill, Paradise, and Emmett F. Glass, Akron, Pa., assignors to Sperry Rand Corporation, New Holland, Pa., a corporation of Delaware
Filed Mar. 8, 1962, Ser. No. 178,348
8 Claims. (Cl. 56—377)

This invention relates generally to hay rakes, and more particularly to a side delivery hay rake of the type having a raking reel adapted to be rotated by a connection to the output shaft of the tractor towing the rake.

Conventionally a power-take-off driven rake has an arched frame supportable at its forward end on the tractor and at its rear end on laterally spaced caster wheels. A rake basket is connected to the frame and extends diagonally relative to ground travel. The raking reel is rotatably carried on the basket, having at its forward end a driven sprocket through which power is transmitted to the reel. Mounted on the frame, and generally adjacent the line of draft, is a driven sheave connected to the tractor through a power-take-off assembly.

In manufacture, the rake frame is generally assembled in one operation, and the rake basket and reel in a separate operation. Subsequently, the rake basket and reel are mounted on the frame. Since the driven sheave is part of the rake basket assembly and the drive sheave is located on the main frame, proper operative relation of the sheaves involves some problems. If the sheaves are too far apart, the endless belt connecting them will be stretched. If the sheaves do not rotate in substantially common planes, then the travel of the belt will be improper. Both of these factors cause rapid belt wear. It is conventional to provide properly related drive and driven sheaves by mounting the drive sheave on the rake frame and for adjustment relative to the driven sheave. However, the structures provided heretofore generally involve more parts and separate adjustments than is desirable, frequently requiring excessive time and manipulation to secure a desired adjustment.

One object of this invention is to provide, in a side delivery rake of the character described, an improved simplified means for mounting a drive sheave for adjustment relative to a driven sheave.

Another object of this invention is to provide a mounting structure which will enable the operator to set the drive sheave in a proper plane relative to the driven sheave and to adjust the drive sheave toward and away from the driven sheave whereby proper tension may be provided on the endless belt connecting the sheaves.

Another object of this invention is to provide a drive sheave mounting structure which enables the sheave to be rocked to desired position and then secured firmly in the selected, adjusted location.

A further object of this invention is to provide a drive sheave mounting structure of the character described which includes means for adjusting the sheave relative to a fixed support bracket to thereby establish proper belt tension, this same means providing part of a rocking support means for the drive sheave.

A still further object of this invention is to provide a mounting structure of relatively simple design whereby it may be manufactured at low cost.

Other objects of this invention will be apparent hereinafter from the specification and from the recital in the appended claims.

In the drawings:

FIG. 1 is a fragmentary plan view of a semi-mounted side delivery hay rake which is powered by the tractor towing the rake and having a drive sheave adjustably mounted according to this invention;

FIG. 2 is a section taken on the lines 2—2 of FIG. 1 looking in the direction of the arrows and showing the drive and driven sheaves;

Figure 6:
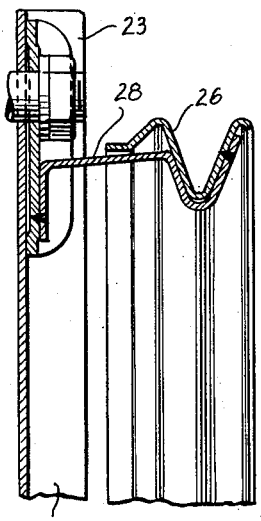
FIG. 6 is an enlarged section taken on the line 6—6 of FIG. 2 looking in the direction of the arrows and showing the mounting of the driven sheave on the rake reel.

Referring now to the drawings by numerals of reference, and particularly to FIGS. 1 and 2, 10 denotes a side delivery hay rake which comprises a main frame 11 on which is mounted a rake basket 12. The basket 12 rotatably supports a raking reel 14 which extends diagonally relative to ground travel as indicated by arrow 15 in FIG. 1. At its forward end 16, converging portions of frame 11 are adapted to be connected to and supported by the tractor, not shown, which tows the rake. At its rearward ends 18, the frame 11 is supported from the ground on caster wheels, not shown.

At its forward diagonal end, the rake basket 12 has a frame member 20 on which a shaft 21 is rotatably mounted. Shaft 21 extends in a fore-and-aft direction and generally parallel to the travel of the rake. It is connected at its rear end to a reel spider 22 which is star shaped, each of the spider arms 23 carrying a rake bar 24 to which rake tines are fastened at 25. When viewed as shown in FIG. 2, spider 22 is adapted to be rotated in a counterclockwise direction whereby the tines on the bars 24 will rake and laterally deliver engaged material.

For rotating reel 14, a driven sheave 26 is mounted on the front face of the spider 22. Angularly spaced bracket members 28 are provided to connect the driven sheave to the spider 22, the connection provided being shown in FIG. 6. Spot welding or other means may be used in the connection. The driven sheave 26 rotates about the axis of the shaft 21, and in a substantially vertical plane. It is driven by an endless belt 29 which extends around the driven sheave and around a drive sheave 30 having a sheave portion 31 and a smaller diameter sheave portion 32. The endless belt 29 may be selectively connected either to the sheave portion 31 or the sheave portion 32. The particular portion of the drive sheave used depends upon the r.p.m. of the power-take-off shaft of the tractor and the ground speed employed. With a standard power-take-off speed of 540 r.p.m. and a ground speed operation up to and including five miles per hour, the small drive sheave portion 31 is used. When the tractor shaft rotation is standard but the rake is to be operated at faster ground speeds such as six to eight miles per hour, as is common in the more arid sections of the country, then larger sheave portion 32 is used. In the drawings, endless belt 29 is shown extending around the larger sheave portion.

In assembly, raking reel 14, with the driven sheave 26, is mounted on the rake basket 12. The drive sheave 30 is mounted on the frame 11. To secure proper sheave alignment and to tighten belt 29 a proper amount, the drive sheave is mounted for adjustment relative to the driven sheave. As shown best in FIGS. 3, 4 and 5, drive sheave 30 is carried on a shaft 34 which extends fore-and-aft relative to ground travel. At its forward end, shaft 34 carries a drive yoke 35 which is connected to a power-take-off assembly 36 (FIG. 1) which is in turn connected to the power output shaft of the tractor, not shown. The shaft 34 is carried on a drive sheave support 38 having axially spaced roller bearings 39. When viewed from the front, sheave support 38 is generally T-shaped as shown best in FIG. 2. It has an upwardly extending arm 40, a downwardly extending arm 41 and a stem or arm 42 which extends toward the driven sheave 26. The arms 40, 41 and 42 of sheave support 38 extend radially outwardly from the axis of the shaft 34 and the axis of rotation of the drive sheave 30. Each of these arms has a curved seat 44 (FIGS. 4 and 5) which faces in a forward direction.

Figure 4:
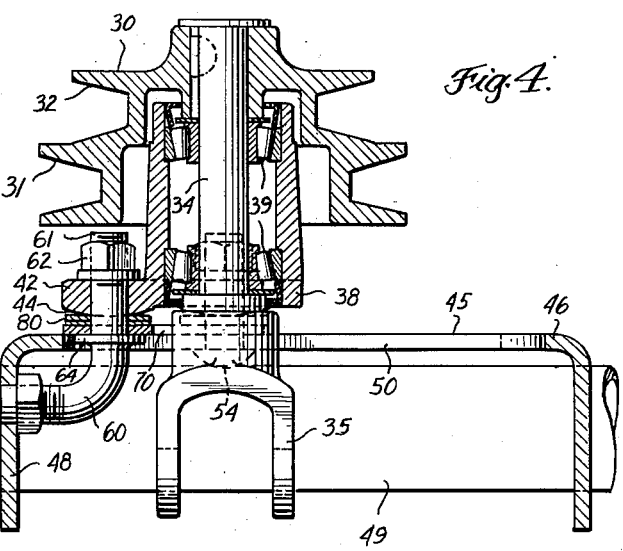
FIG. 4 is a section taken on the line 4—4 of FIG. 3 looking in the direction of the arrows.
Figure 5:
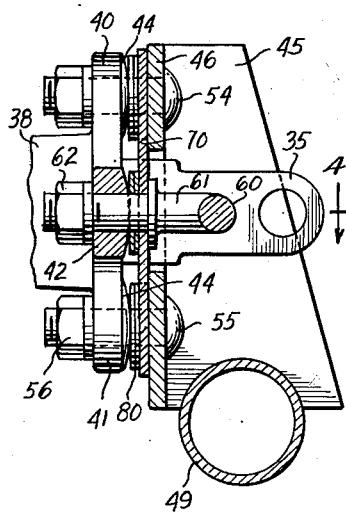
FIG. 5 is a section taken on the line 5—5 of FIG. 3 looking in the direction of the arrows.

Sheave support 38 is connected to a bracket 45 which is U-shaped when viewed in plan (FIGS. 1 and 4). Bracket 45 has rearward bight portion 46 and forwardly projecting sides, one of which 48 forms a flange on the side of the bracket toward driven sheave 26. At its lower end, bracket 45 is welded to a support pipe 49 which extends transverse to the direction of travel of the rake. Pipe 49 is integral with and part of frame 11. The bight portion 46 of bracket 45 is relatively flat and extends in a transverse vertical plane, having slots which also extend transversely, namely middle slot 50, top slot 51 and bottom slot 52. The middle slot 50 is elongated and substantially wider than the top and bottom slots 51 and 52. Shaft 34 projects forwardly through the middle slot 50 as does the neck portion of the yoke 35.

For mounting drive sheave 30 on bracket 45, mounting bolts 54 and 55 are provided, the bolt 54 extending through slot 51 and through the arm 40 of support 38, while the bolt 55 extends through slot 52 and through the arm 41 of the support. Nuts 56 are provided on the bolts whereby a tight connection between support 38 and bracket 45 may be obtained. A third fastener 60 is provided which is L-shaped when viewed in plan as shown in FIG. 4. One leg 61 of the fastener extends through middle slot 50 and through arm 42 of support 38. It is fastened thereto by a nut 62. A radially extending shoulder 64 is provided on leg 61 and located in slot 50. The other leg 65 of fastening member 60 freely extends through the flange or side 48 of the bracket 45 and such leg is threaded. Nuts 66 are provided on opposite sides of flange 48, one nut serving for axial adjustment of leg 65 and the other nut being used for locking purposes. On adjustment, leg 65 is moved to thereby shift the drive sheave support 38 toward or away from the driven sheave 26, as required, to thereby control the tightness of belt 29. It will be apparent that to adjust the drive sheave 30, it is first necessary to loosen the fastening bolts 54 and 55. However, once the drive sheave is in adjusted position as established by the fastening member 60, then the bolts 54 and 55 are tightened in place to securely hold the parts.

Figure 3:
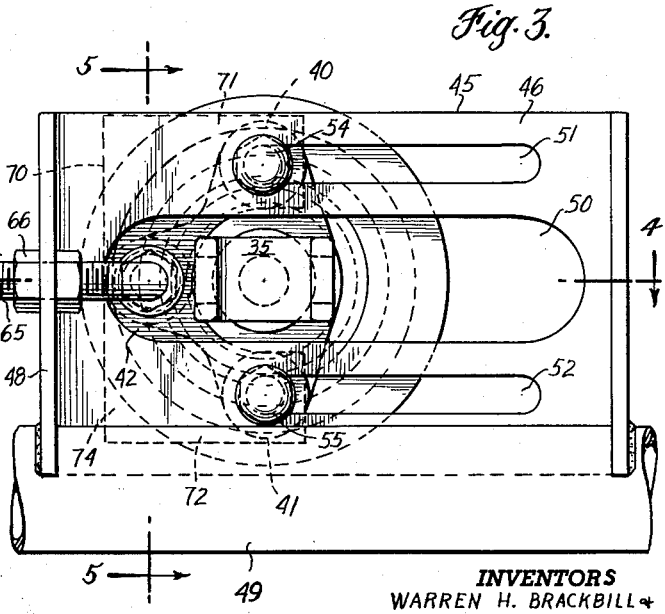
FIG. 3 is an enlarged front elevation of the mounting structure provided for the drive sheave.

Since the leg 61 of fastening member 60 extends through large slot 50 and has no bearing engagement with bracket 45, an insert 70 is provided. Insert 70 is U-shaped when viewed from the front as shown in FIG. 3 having a top leg 71 through which the bolt 54 projects, a bottom leg 72 through which bolt 55 projects and a bight portion 74 engaged by the radial flange 64 on leg 61.

In order to properly orient the plane of rotation of drive sheave 30, the sheave is mounted to be rocked relative to mounting bracket 45. Such rocking is provided by spacers or washers 80 (FIGS. 4 and 5) located between insert 70 and the curved portions 44 of sheave support 38. By varying the number of spacers between support 38 and any of the fasteners 54, 55 or 60, the angular relationship of the shaft 34 and bracket 45 may be established as desired. Also, the sheave 30 can be adjusted axially toward and away from the bracket 45 by the number of sheaves used. Since support 38 has curved seats 44 it is readily pivotal about its engagement points with insert 70 and thus relative to the bracket 45.

With this adjustable mounting structure for drive sheave 30, a proper tension can be established for drive belt 29 so that there is proper power transmission to the driven sheave 26. In like respect, the plane of rotation of the drive sheave 30 can be established as required so that the drive sheave will rotate in a plane which is common with the plane of the driven sheave 26. This prevents undue wear on the transmission belt 29. The adjustability provided also allows greater variations in manufacturing tolerances. Even though the drive and driven sheaves are carried on separately assembled structural units, they can nevertheless be oriented relative to each other when the final assembly of the rake is made. Therefore, when the rake structure is completed, a proper drive transmission will be had to the reel 14 and the components of the drive structure will have long life. The mounting for drive sheave 30 is simple to manufacture and use. The three point, rockable engagement of sheave support 38 with bracket 45 and the spacers 80 provide a means whereby the axial position of the drive sheave can be set as desired and the proper plane of rotation of the sheave can be readily established. The single L-shaped fastener 60 serves a dual role, providing one of the three support points for sheave support 38 and also providing the belt tightening adjustment required.

While this invention has been described in connection with a particular embodiment thereof, it will be understood that it is capable of various modifications, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In a side delivery rake, a frame, a basket connected to said frame, a raking reel rotatably mounted on said basket and extending diagonally relative to ground travel, a driven sheave connected to a forward end of said reel to transmit power thereto, a drive sheave carried on said frame, power means connected to said drive sheave, an endless belt connecting said drive and driven sheaves, both of said sheaves being rotatable in generally vertical planes and laterally spaced relative to each other, and means interposed between said frame and said drive sheave for adjusting the operative position of the drive sheave whereby the tightness of said endless belt may be regulated and the drive sheave may be properly aligned and located relative to said driven sheave, said adjusting means comprising a bracket affixed to said frame and extending vertically, said bracket having transverse slots, a support on which said drive sheave is rotatable, a plurality of fasteners extending through said slots and connecting said support to said bracket, said fasteners being angularly spaced relative to each other about the axis of rotation of said drive sheave, a plurality of curved seats on said support, one for each fastener, and means interposed between said support and said bracket to rock the support on said curved seats.

2. In a side delivery rake as recited in claim 1 wherein said plurality of fasteners comprise three fasteners, two of which are located at diametrically opposite sides of said axis of the drive sheave, one above and one below said axis, the third fastener being located on the side of the axis toward said driven sheave.

3. In a side delivery rake as recited in claim 2 wherein said transversely extending slots in said bracket extend parallel to each other and vertically spaced, said third fastener and the power means for the drive sheave extending through the middle slot and said two fasteners extending respectively through the other slots.

4. In a side delivery rake as recited in claim 3 wherein said bracket has a flange portion on the side thereof toward said driven sheave and extending axially away from said drive sheave, and said third fastener being L-shaped, having one leg connected to said support and another leg connected to said flange.

5. In a side delivery rake as recited in claim 4 wherein means is provided to connect said other leg to said flange for adjustment relative thereto to thereby shift said support relative to said bracket and thereby control the tightness of said endless belt, means also being provided to lock said other leg in adjusted position.

6. In a side delivery rake as recited in claim 2 wherein said means to rock said support comprises spacer washers engageable with said curved support seats.

7. In a side delivery rake as recited in claim 3 wherein a U-shaped piece is inserted between said bracket and said support, with the bight of the piece facing said driven sheave, said two fasteners extending through sides of the piece and said third fastener extending through said bight.

8. In a side delivery rake as recited in claim 7 said middle slot in said bracket is wider than the other two slots, said third fastener freely projecting through said middle slot and having a shoulder engaging said U-shaped piece.

References Cited in the file of this patent

UNITED STATES PATENTS

| | | |
|---|---|---|
| 2,637,966 | Richey | May 12, 1953 |
| 2,681,543 | Richey | June 22, 1954 |
| 2,906,076 | McCarty et al. | Sept. 29, 1959 |